United States Patent [19]
Wildenburg et al.

[11] Patent Number: 5,230,873
[45] Date of Patent: Jul. 27, 1993

[54] PROCESS FOR PRODUCING AMORPHOUS BORON NITRIDE OF HIGH HARDNESS

[75] Inventors: Jörg Wildenburg, Bonn; Georg Will, Swisttal-Buschhoven, both of Fed. Rep. of Germany

[73] Assignee: Firna Siegfried Golz, Hellenthal-Blumenthal, Fed. Rep. of Germany

[21] Appl. No.: 659,339

[22] PCT Filed: Sep. 11, 1989

[86] PCT No.: PCT/EP89/01049
§ 371 Date: Mar. 11, 1991
§ 102(e) Date: Mar. 11, 1991

[87] PCT Pub. No.: WO90/02704
PCT Pub. Date: Mar. 22, 1990

[30] Foreign Application Priority Data
Sep. 10, 1988 [DE] Fed. Rep. of Germany ....... 3830840

[51] Int. Cl.$^5$ .......................................... C01B 21/064
[52] U.S. Cl. ...................................... 423/290; 51/307
[58] Field of Search .................. 423/290, 289; 51/307; 501/96

[56] References Cited

U.S. PATENT DOCUMENTS

| | | | |
|---|---|---|---|
| 3,192,015 | 6/1965 | Wentorf, Jr. ........................... | 51/307 |
| 4,623,408 | 11/1986 | Karamon et al. .................. | 148/304 |
| 4,772,575 | 9/1988 | Ota et al. ............................. | 423/290 |

FOREIGN PATENT DOCUMENTS

| | | | |
|---|---|---|---|
| 396448 | 11/1990 | European Pat. Off. ............ | 423/290 |
| 49-27518 | 7/1974 | Japan .................................. | 423/290 |
| 49-27758 | 7/1974 | Japan .................................. | 423/290 |
| 1-55508 | 8/1985 | Japan .................................. | 423/290 |
| 63505 | 4/1986 | Japan . | |
| 117107 | 6/1986 | Japan . | |
| 295211 | 12/1986 | Japan . | |
| 62-263962 | 11/1987 | Japan . | |

OTHER PUBLICATIONS

*Metallic Glasses,* American Society for Metals, 1978: pp. 9-12.

*Primary Examiner*—Michael Lewis
*Assistant Examiner*—Stephen G. Kalinchak
*Attorney, Agent, or Firm*—Antonelli, Terry, Stout & Kraus

[57] ABSTRACT

A boron nitride, of amorphous structure, which can scratch diamond, is produced from hexagonal or turbostratic boron nitride as starting material. In the process for the production of the amorphous boron nitride, the starting material is subjected to pressures above 70 Kbar and temperatures of at least 1650° C. for a period sufficient for the starting material to be completely melted, followed by quenching the resulting boron nitride melt and thereafter forming grains of amorphous boron nitride. The amorphous structure of the boron nitride is determined by X-ray and electron beam investigation.

7 Claims, 11 Drawing Sheets

FIG. 11 aBN-2    Pt

PROCESS FOR PRODUCING AMORPHOUS BORON NITRIDE OF HIGH HARDNESS

BACKGROUND OF THE INVENTION

Cubic boron nitride is a known industrial abrasive. It is produced from hexagonal boron nitride, hBN, at high pressures and temperatures, very often under the influence of Mg, Li, $Mg_3N_2$ and $Li_3N$ as flux (catalyst), as described, for example, in U.S. Pat. No. 2,947,617. To obtain the cubic form of boron nitride, this crystal structure must be favored. This occurs on the one hand by the addition of selected active catalysts based on alkali metals, alkaline earth metals, lead, tin, antimony, or nitrides of these metals, and the like, and on the other hand by a directed slow cooling of the melt which favors the crystal growth. Typical crystal morphology for cBN is octahedral or tetrahedral. Typical crystal sizes range from about 20 up to 500 $\mu$ (0.02-0.5 mm), dependent on the production conditions.

Hexagonal boron nitride is used in industry in pressed and sintered bodies as a powder, paste or spray, e.g., to produce or line casting molds or also as a lubricant, as a temperature-resistant shaped material.

Cubic boron nitride, which is distinguished from hexagonal boron nitride by its higher temperature resistance and by its hardness, which lies only slightly below that of diamond, finds a use as a cutting grain in the tool and abrasive industry. A further form of boron nitride is known under the name "turbostratic boron nitride, tBN". It is used as a starting material for pressed bodies and for the production of cubic boron nitride.

In addition to these, up to now there has only been a so-called "amorphous boron nitride", synthesized by Sumiya et al., see Materials Research Bulletin, 18, pages 1203-1207, 1983; it is termed aBN-1 below, for the soft phase produced at normal atmospheric pressure. This aBN-1 is a boron nitride which no longer possesses any graphite-like layer structure, but consists of fragments of crystal lattice and is soft. Thus it is not established whether aBN-1 is really amorphous or whether it is only present in a finely-powdered state.

A suitable apparatus for producing the pressures and temperatures in order to produce cubic boron nitride from hexagonal boron nitride is described, for example, in U.S. Pat. No. 2,941,243.

SUMMARY OF THE INVENTION

There is at present a great industrial need for abrasives of greater hardness. The object of the invention is to supplement or widen the palette of the known abrasives with a new one.

According to the invention, an amorphous boron nitride (aBN-2) with a hardness corresponding to the hardness of diamond has been found. The boron nitride aBN2 according to the invention, of a structure which is amorphous by X-ray and electron beam determination, has a hardness sufficient to scratch diamond. It is characterized by an amorphous (internal) structure, i.e., non-crystalline arrangement of the atoms. Apart from this, the grains can however have a pseudomorphic form, i.e., the hexagonal or cubic form can still exist. The grains can also have a glassy external form. To distinguish it from the known boron nitride produced at normal pressure and called amorphous, termed aBN-1, the amorphous boron nitride according to the invention is termed aBN-2. The boron nitride according to the invention is amorphous by X-rays and electron beam.

According to the invention, amorphous boron nitride of high hardness can be produced from hexagonal or turbostratic boron nitride (BN) as starting material, at pressures exceeding 70 Kbar, preferably 75 Kbar or more, and at temperatures of at least 1650° C. or higher, by complete melting of the boron nitride charged, in that the thus obtained boron nitride melt is quenched. The crystalline components contained in the starting material are, according to the invention, completely melted and receive by quenching the consistency of a metastable, supercooled melt, so that there result grains of completely amorphous boron nitride with X-ray and electron beam amorphous structure, termed aBN-2.

In carrying out the process, after melting, the heat supply is first shut off for quenching the starting material, or if necessary a partial cooling of the melt, still under full pressure, is carried out, and relief of the pressure is then effected.

In order to carry out the process with good results, it is provided that after the heating of the starting material in the melt region, the reaction conditions of pressure and temperature are maintained for a long period. Here a period of at least several minutes should be adhered to. The period increases in dependence on increasing amounts of the charged material. In this way it is ensured that all the crystal nuclei present are destroyed, i.e., that crystal nuclei are no longer present. The heating times take, according to the amount of starting material, 5-30 minutes with the known apparatuses.

The process according to the invention is carried out with charging of clean, i.e. pure, starting material, preferably hexagonal boron nitride, and at the given pressures and temperatures.

It was found according to the invention that amorphous boron nitride of high hardness (aBN-2) can be produced without the addition of catalysts. Here active catalysts and passive catalysts are to be distinguished.

The active catalysts engage in the process as reactants themselves and require a large mass fraction to the starting substance. Hence they are present as a foreign phase in the product of the process or very strongly determine the form and size of the process product. They have to be subsequently removed. It was found according to the invention that the yield of amorphous boron nitride, aBN-2, is markedly higher without addition of catalyst to the starting material, or with the addition of passive catalysts, than it is when active catalysts are added. As active catalysts there were used $Li_3N$, $Mg_3N_2$, $BCl_3$, $CCl_4$, $NH_4Cl$, $NH_4F$, $Ca_3B_2N_4$.

According to the invention, passive catalysts were effectively used. These act favorably on the flow behavior and the heat transfer to the starting material during pressing and melting. At the end of the process for the production of aBN-2, they are either present unchanged or, with water as catalyst, no longer present. The yield of aBN-2 is increased up to nearly 100% in relation to the starting material by the use of passive catalysts. By the use of passive catalysts, larger grains of aBN-2 can be produced. Suitable passive catalysts are, e.g., Pt, Zr, $H_2O$, Co and C (platinum, zirconium, water, cobalt and carbon).

It has been found to be advantageous to add passive catalysts in small amounts, such as about 3-20 wt. % in relation to the amount of the starting material.

The direct production of amorphous boron nitride aBN-2 without catalysts takes place with good yield already from pressures of 75-78 Kbar at temperatures of 1800°-2000° C., preferably from 1900° C. As long as the reaction conditions of temperature and pressure are high enough and a sufficiently long period is maintained, so that according to the invention a melt completely free from crystal nuclei is obtained, the starting material is completely converted into amorphous boron nitride aBN-2. If on the contrary the reaction conditions of temperature and pressure are left insufficiently high and do not act for long enough on the starting material (BN), then cubic boron nitride is formed, among others.

BRIEF DESCRIPTION OF THE DRAWINGS

Further developments of the invention are explained below in an example of an embodiment and with reference to the drawings wherein.

DETAILED DESCRIPTION OF THE INVENTION

Either hexagonal or turbostratic boron nitride is used as the starting material for the production of amorphous boron nitride. It was stirred and homogenized with 8% water to a paste. This paste was filled into a platinum cylinder of 3 mm diameter and 5 mm height and closed with a lid. The resulting platinum capsule was compressed with a hydraulic hand press from 5 mm to about 3 mm. This occurs with a press force of about 5 t (ton). The boron nitride is thereby compressed and gas bubbles are removed. The platinum capsule itself is cold-welded by this process. The resulting compressed capsule is built into a high pressure insert, see FIG. 14, consisting of cylindrically arranged pyrophyllite, graphite, corundum, molybdenum and steel parts. The high pressure insert 30 is likewise cylindrical and is rotationally symmetrical about its longitudinal axis and mirror imagewise symmetrical about its transverse axis. The platinum capsule 305, containing the starting material BN, is arranged in the center. The cylindrical platinum capsule is seated centrally in a tube 306b of pyrophyllite, which projects beyond the capsule on both sides. Above and below there are seated on the platinum capsule a respective plug assembled from two cover parts 306d and 306c of pyrophyllite, to close the tube sealingly at the top. Pyrophyllite is a natural material, electrically insulating, which transmits pressure very well and also does not flake at the required high pressures. A graphite tube 304 adjoins the tube 306b externally, and serves for heating to produce the desired high temperatures at a corresponding high current loading. A tube 306a of pressure-tight, electrically insulating pyrophyllite further adjoins the graphite tube 304 externally. The outer closure is then formed by a thick-walled tube 303 of pyrophyllite, if necessary in a soft setting. The thus insulated heatable platinum capsule is then covered top and bottom with steel or molybdenum plates 301b, which contact the graphite tube 304 and act as current leads. The covers 300 form the closure; they have cover plates 302 of sintered corundum, $Al_2O_3$, which are mounted in steel rings 301 and act as abutment faces for the press punch. The platinum skin of the capsule acts as a protective cover for the boron nitride and is temperature-stable up to about 1680° C. Molten platinum is thus an indication that this temperature was exceeded in the production of aBN-2.

Figure 13:
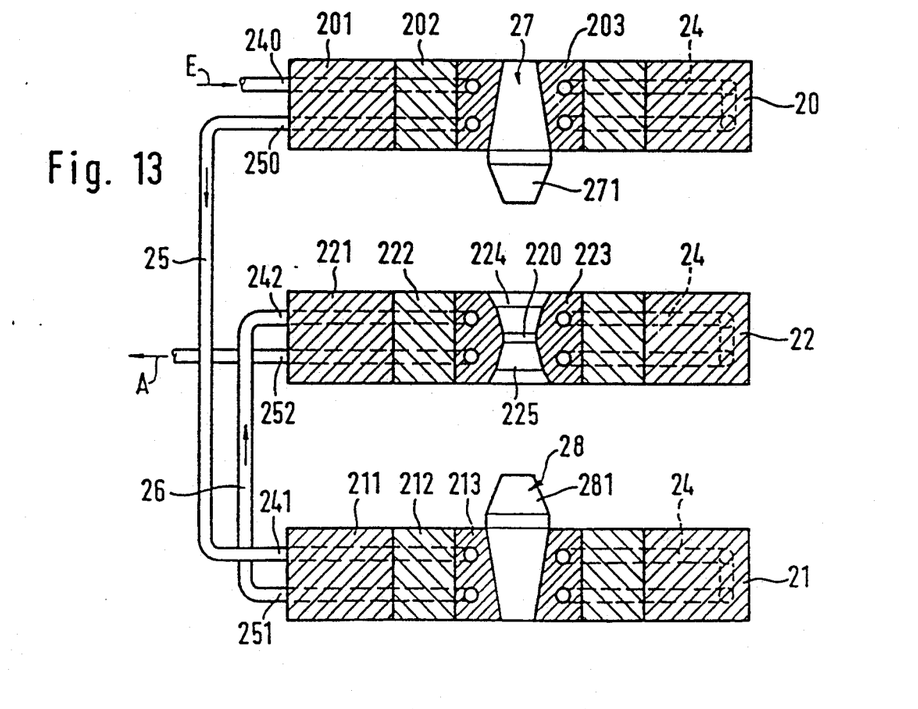
FIG. 13 shows a schematic assembly drawing of a press tool.
Figure 14:
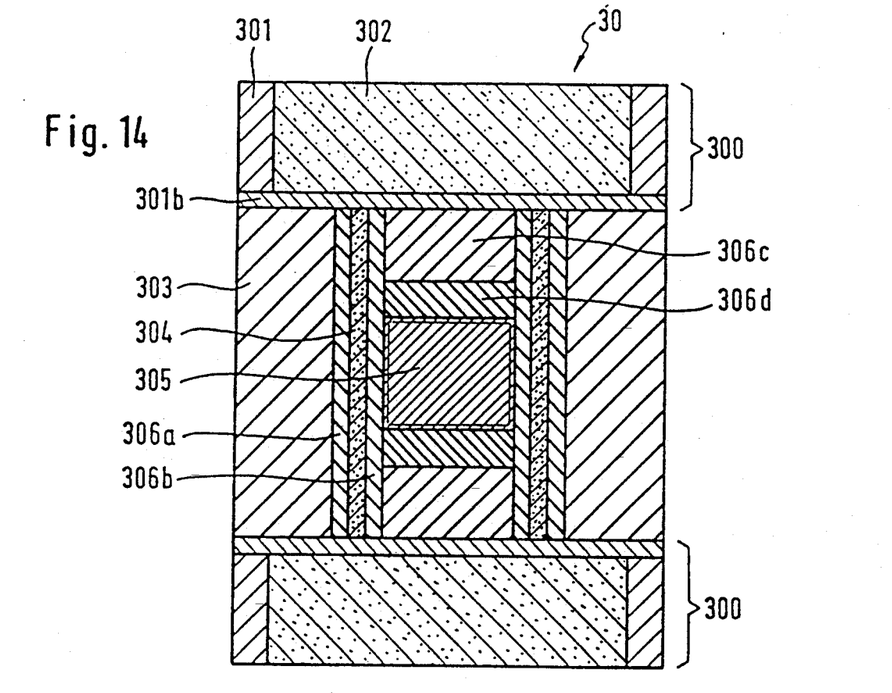
FIG. 14 shows a schematic cross section through a high pressure insert with platinum capsule.

This high pressure insert 30 makes it possible to supply pressure and temperature in a suitable manner and of the required magnitude to the boron nitride in the capsule interior. The completed high pressure insert 30 is inserted into the press tool, see FIG. 13. This consists in principle of three rotationally symmetrical parts:

The upper press plate 20 with water cooling and plunger mount with plunger 27 of tungsten carbide hard material, The middle press collar 22 with water cooling and the inner annular press die 223 of tungsten carbide hard material, The lower press plate 21, which is fitted mirror imagewise symmetrically of the upper press plate and likewise has water cooling, plunger mount and plunger 28 of tungsten carbide hard material.

The press plates 20, 21 and also the press collar 22 are respectively assembled from several rings 201, 202, 203 or 211, 212, 213 or 221, 222, 223 of which the two outer ones are made of steel or the like and the respective innermost ring consists of hard material. Thus the inner rings of the press plates form the plunger mounts for the plungers 27 or 28 and are likewise made of tungsten carbide hard material. The plungers are conically shaped at the head and are introduced into corresponding conical apertures 224, 225 at the top and bottom of the press die 223.

FIG. 13 shows the press tool in the retracted position of the parts. The press die 223 has a cylindrical cavity 20 220 in the center, which will be termed "the belt" and into which the high pressure insert is inserted, so that it projects, however, upwards and downwards into the conical-shaped enlargements 224. When the plungers 27, 28 provided with conical ends 271 and 281 respectively, are advanced, the high pressure insert is pressed together in the direction of the narrowest portion of the enlargement 224, the belt. All the metal parts of the press tool including the plungers are heated by electric current and hence very strongly heated. For this reason, the tool parts 20, 21, 22 are cooled. For this purpose, they are provided with through-flow cooling channels 24, which are shown here only schematically, and which are connected via inlets 240, 241, 242 to each press tool and via outlets 250, 251, 252 to a cooling water system. The cooling water circuit is designed such that the cooling water is first introduced at an inlet 240 into the upper press plate in the direction of the arrow E, then from the upper press plate into the lower press plate via the duct 25 and via the inlet 241, then out of the lower press plate via the duct 26 into the press collar via the inlet 242, and out of this is fed back again into the cooling water supply at the outlet A.

The described three-part press tool is connected, during the synthesis of aBN-2, to a cooling water circuit and also to a source for the heating current. The cooling water reduces the material loading on the steel and hard material. The current feed is arranged such that a high current (40-20 A) can flow at low voltage (2-10 V) into the interior of the assembly and can there heat the graphite hollow cylinder due to its inherent resistance. This miniature furnace is insulated by the pyrophyllite cylinder 306b as a sheath around the platinum capsule 306.

Figure 12:
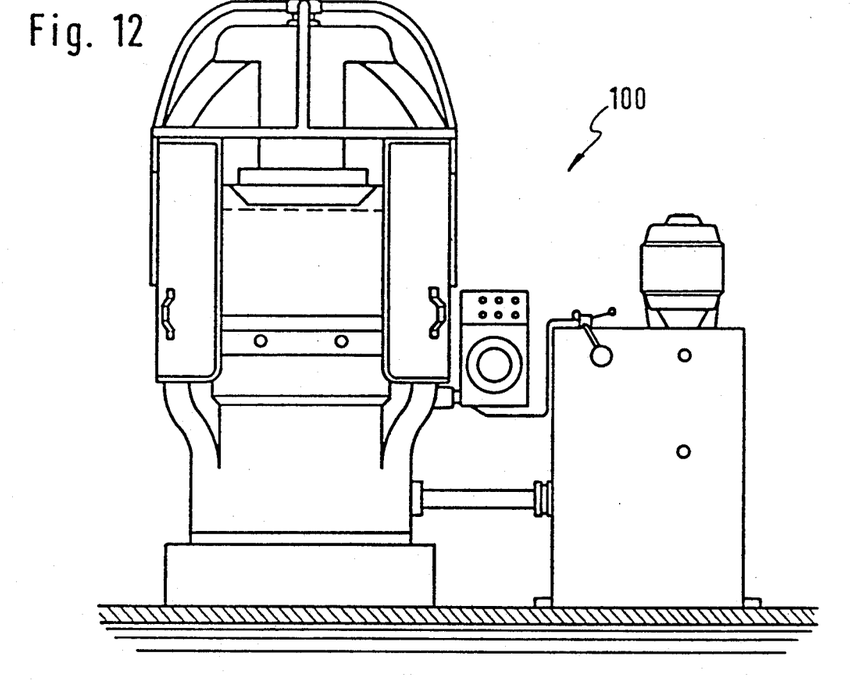
FIG. 12 shows a schematic view of a high pressure press.

The heatable water-cooled press tool is placed in a hydraulic 630 t press and acted on by a press force of a maximum of 110 t: see the schematic representation of a press 100 in FIG. 12.

The reaction times are 15-30 minutes. The crystalline components contained in the starting substance are completely melted by the pressure and temperature conditions.

After this time the high pressure insert or the capsule is quenched by cessation of the heating current, followed by pressure relief in a matter of seconds. After quenching, the starting material has been converted and possesses the consistency of a metastable supercooled melt, i.e., glass-like material - BN-glass - termed aBN-2. Since the mass of the inserted capsule is small, the capsule can cool down (from melt temperature to about room temperature) in a matter of seconds after the heating current is switched off, due to which crystallization is prevented. As against this, the decompression takes several minutes.

For preparation of the initial mixture, 46 mg of hBN and 4 mg of water were used. About 1 kW heating load was used for the temperature production. For water cooling during the synthesis, about 500 l of water circulated through the cooling system. The most rapid heating-up time from 20° C. to 1700° C. took about 3 minutes, and the pressure loading took on average 5 minutes to reach the maximum value provided by the press used, about 78 Kbar.

Setting and regulation of temperature was carried out by measurements on calibration assemblies and extrapolation of the load curve. The synthesis assembly was measured with Ni-NiCr thermoelements up to 1200° C. and plotted against the heating load. The measurement curve obtained was extrapolated to 2000° C.

The heating load was manually controlled on the basis of the data thus obtained. For further temperature monitoring, thermochromic pigments were used instead of the sample. These oxide pigments show a characteristic color change on reaching a minimum temperature. The finest temperature gradients in the sample space could thus be measured by microscopic evaluation. Further, a temperature estimation was carried out based on the melting of the crucible material. The maximum temperature reached was accordingly 2000° C.

Figure 15:
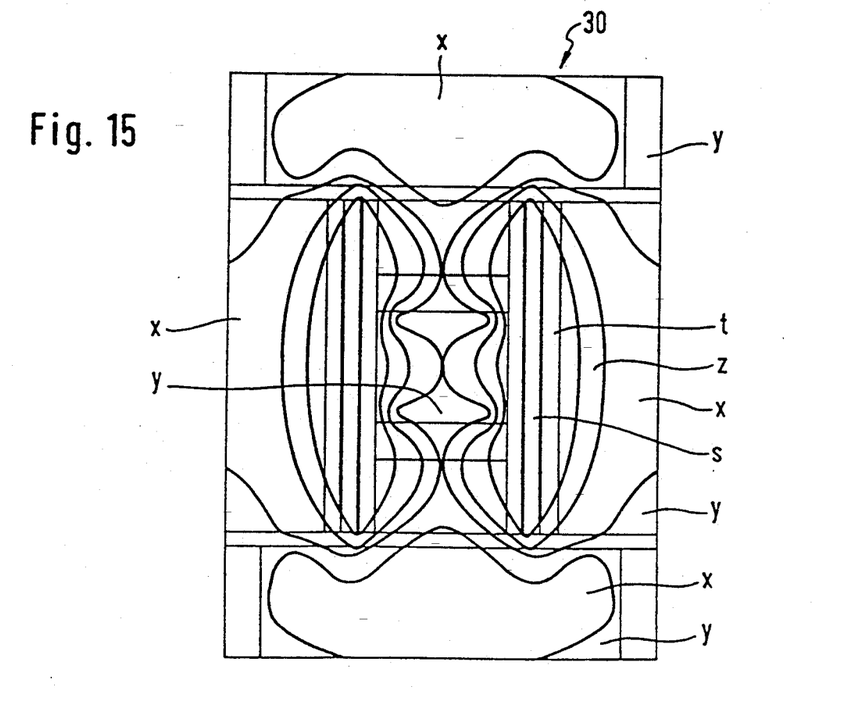
FIG. 15 shows the temperature distribution in the high pressure insert on heating up.

A temperature distribution on heating the high pressure insert in the press tool is shown schematically in FIG. 15. It can be seen how the high temperatures produced by the graphite tube 304 spread out and simultaneously there occurs on the outside a screening by the cover parts 302 and the pyrophyllite tube 303. The momentary temperature picture on reaching 1600° C. in the zone 5, in the graphite tube is shown, where a temperature of about 1400° C. is present in the adjacent zone t, a temperature of 1100° C. in the adjoining zone z, a temperature of about 700° C. in the center y, and externally a temperature of about 740° C. is present in the regions x.

The pressure reached in the interior of the capsule was calculated from calibration pressure curves of bismuth strips (with known transition pressures) and by computer methods. At most 80 Kbar was attained here.

The product obtained consists of water-clear to amber-colored grains of 1/100 mm to 1 mm diameter, which in a compact mass appear white to brownish-black. Because of the small dimensions of the sample space used, the yield of large grains (0.5-1 mm) is low, i.e., 3 volumes %. The largest proportion, at 50 volume %, is of grains of about 1/50 mm size. The residual fraction consists of grains with diverse sizes. The grains are amorphous by X-ray and electron beam, and scratch diamond on all faces: see FIG. 10. They show strains in polarized light, have insulating properties, and conduct heat well. Scanning electron microscope pictures show a glass-like grain form, but pseudomorphic forms are also possible. The individual grains have a somewhat irregular ameba-like shape.

The amorphous boron nitride aBN-2 according to the invention is a tough material which can be used advantageously in grinding wheels, since it shows little tendency to shatter. This is also an advantage over diamond and cubic boron nitride, which can be split along the different fracture surfaces of the crystal lattice. As a grinding material, it has a substantially higher working life than, e.g., cBN or diamond, since these are more likely to shatter because of the crystal structure. The new amorphous and tough boron nitride aBN-2, as against this, cannot be fractured in an oriented manner.

When a passive catalyst, e.g., platinum or cobalt, is added, a greater yield of large grains is obtained.

Figure 1:
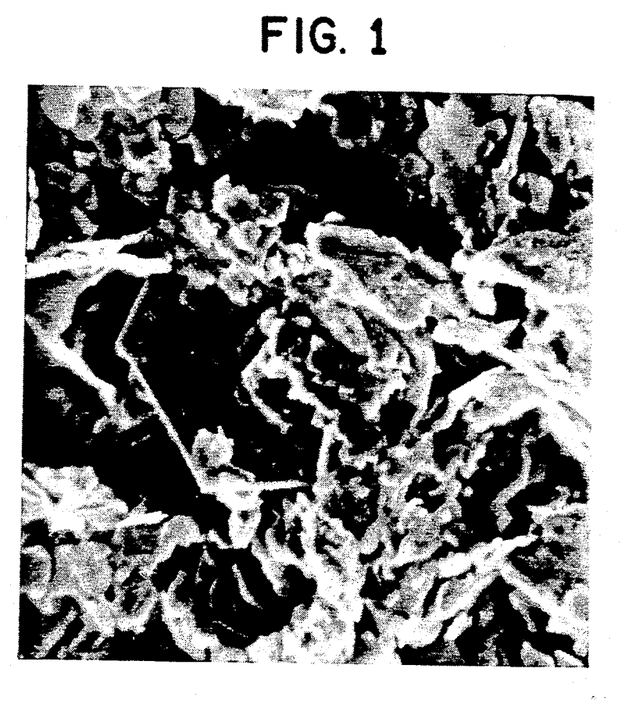
FIGS. 1-8 show electron microscope pictures of different kinds of boron nitride.

The product according to the invention - amorphous boron nitride aBN-2 - is compared with the different known varieties of boron nitride by means of electron microscope FIG. 1 shows hexagonal boron nitride (hBN) in a scanning electron microscope picture, enlarged about ×10600. Six-cornered platelets can be clearly seen.

Figure 2:
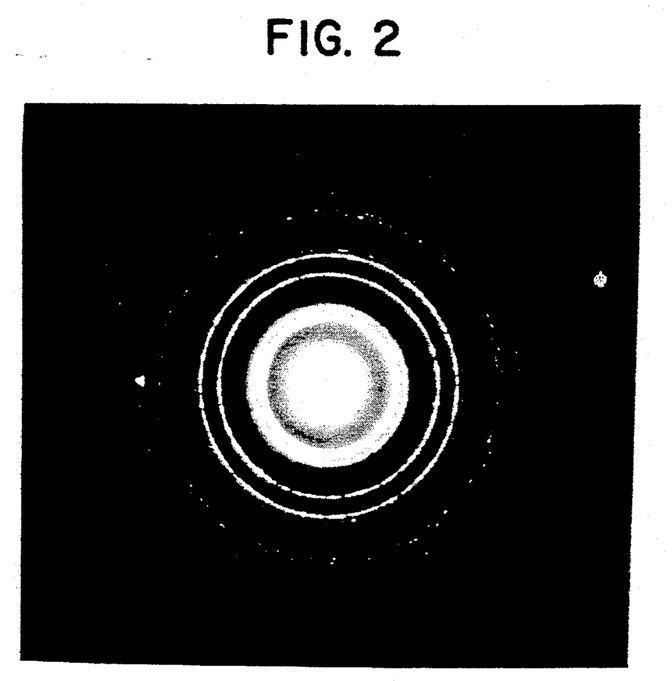

FIG. 2 shows hexagonal boron nitride (hBN) in a transmission electron microscope diffraction exposure (0001). Many fine reflection points can be seen on concentric circles. hBN is a starting material for the production of aBN-2.

Figure 3:
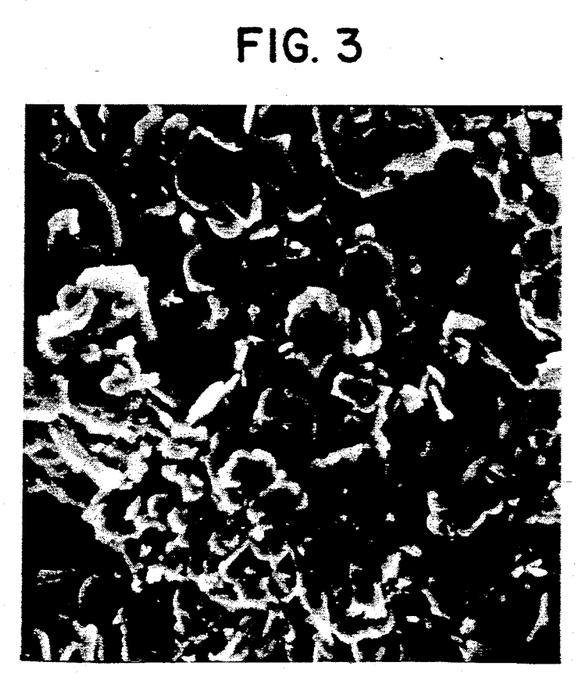

FIG. 3 shows "turbostratic" boron nitride (tBN) in a scanning electron microscope exposure, enlarged about ×10600. Starting material for the production of aBN-2.

Figure 4:
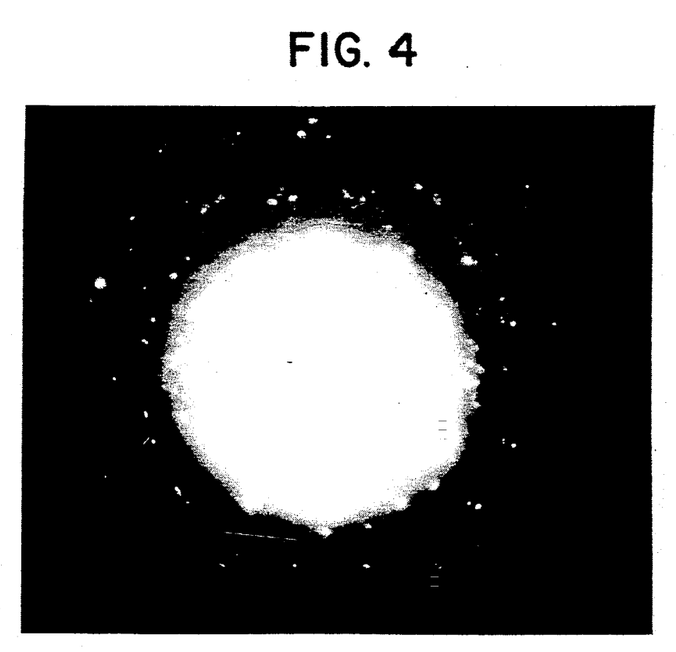

FIG. 4 shows "Turbostratic" boron nitride (tBN) in a transmission electron microscope diffraction exposure (0001). Many reflection points can be seen, some double.

Figure 5:
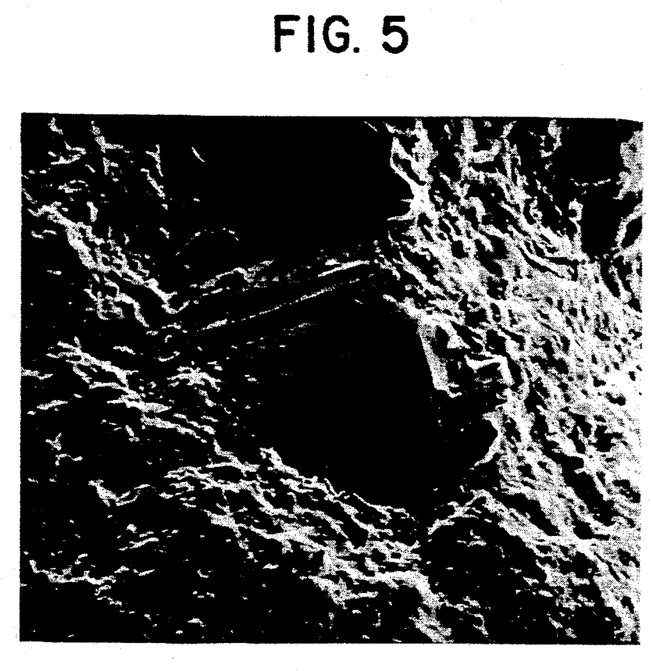

FIG. 5 shows cubic boron nitride (cBN) in a scanning electron microscope exposure, enlarged about ×570. Up to now the hardest BN modification in cubic habit, according to U.S. Pat. No. 2,947,617.

Figure 6:
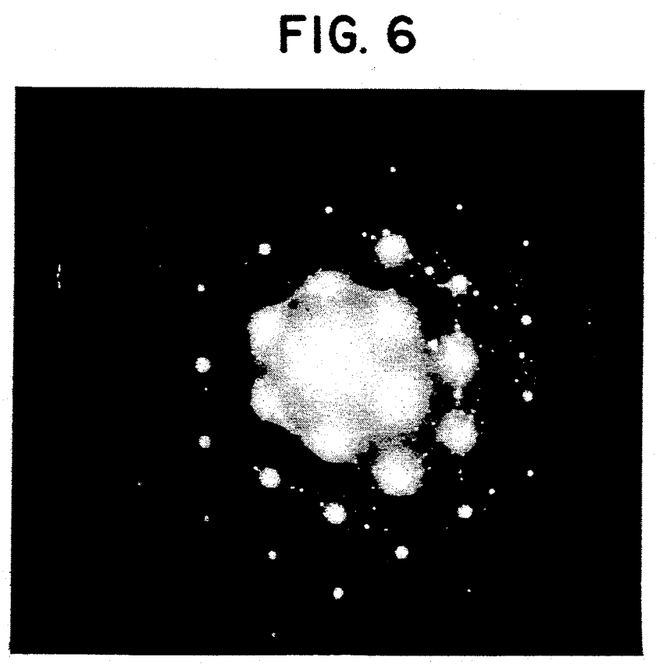

FIG. 6 shows cubic boron nitride (cBN) in a transmission electron microscope diffraction exposure (111). A few strong reflection points are seen in a 6-angled grid arrangement with a view in the direction of a 3-fold space axis.

Figure 7:
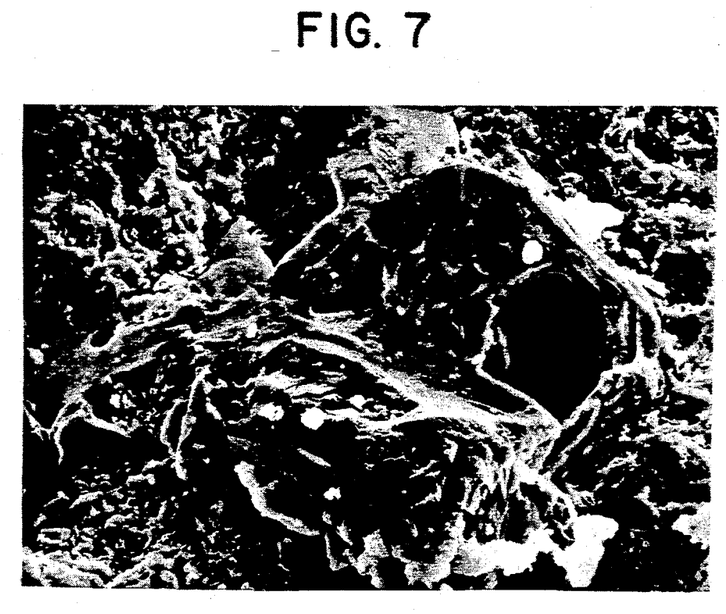

FIG. 7 shows the new kind of boron nitride (aBN-2) in a scanning electron microscope exposure, enlarged about ×800. Melt particles without symmetry or faces can be seen, in a finer matrix.

Figure 8:
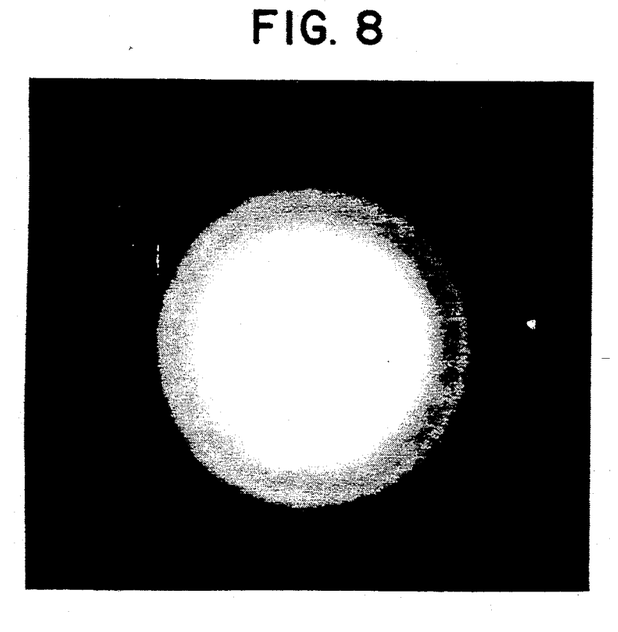

FIG. 8 shows the new kind of boron nitride (aBN-2) in a transmission electron microscope diffraction exposure without orientation. No (!) reflection points can be seen, but only diffuse rings. A true amorphous material is concerned.

Figure 9:
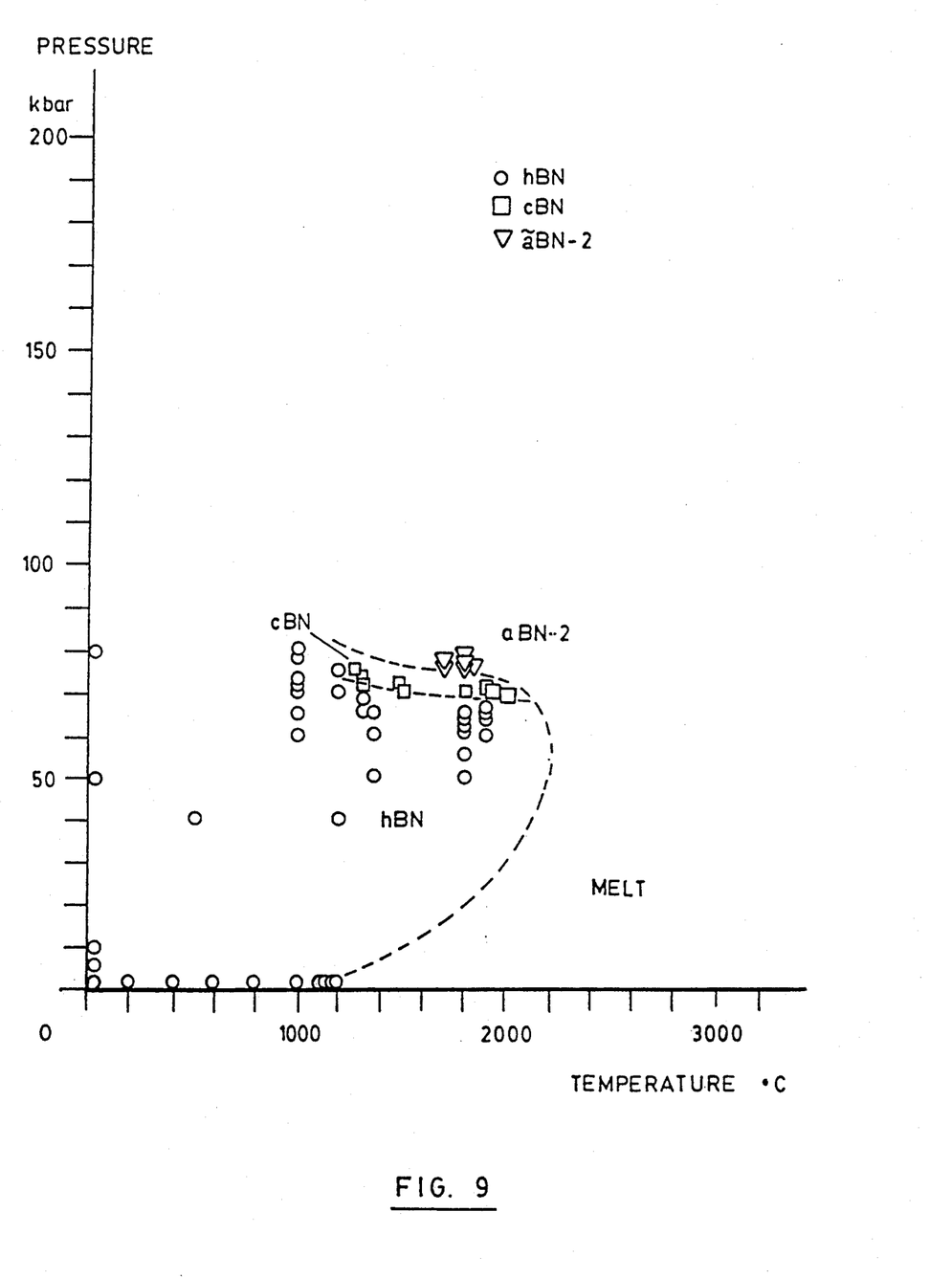
FIG. 9 shows a phase diagram of the different boron nitrides; [KEY: Ordinate, Pressure (Kbar); abscissa, Temperature °C.; "Schmelze"=Melt.]

FIG. 9 shows the phase diagram of hexagonal boron nitride (hBN), cubic boron nitride (cBN) and amorphous boron nitride (aBN-s) in dependence on pressure and temperature, as ascertained by research on direct synthesis of amorphous aBN-2. hBN is represented by O, cBN by □, and aBN-2 by ▽. The broken lines indicate the assumed phase boundaries between the physically different substances. The identification of the phases resulted after quenching and decompression. It is conceivable that the phase boundaries are displaced in an in-situ process.

Figure 10:
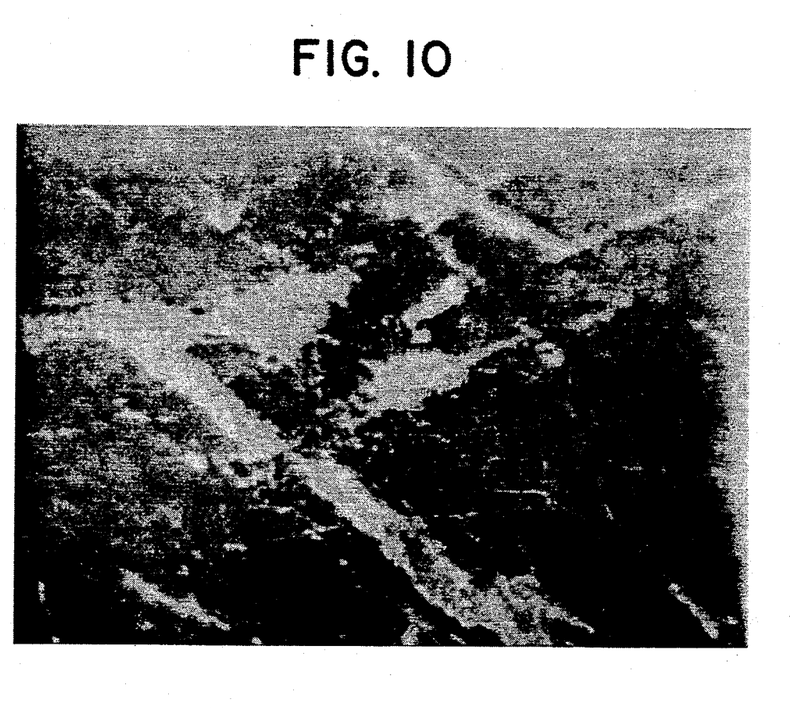
FIG. 10 shows a picture of a scratched diamond (001)

FIG. 10 shows a photograph, enlarged 50 times, of a flat surface (001 face) of a brilliant-cut diamond, scratched by amorphous aBN-2 grains.

Figure 11:
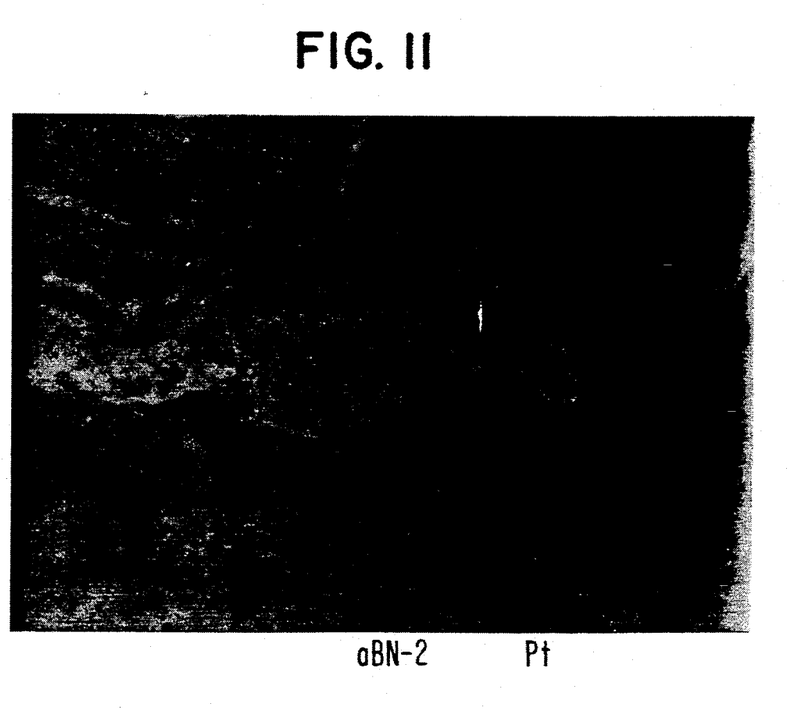
FIG. 11 shows a picture of polished aBN-2 grains.

FIG. 11 shows a sectional picture of aBN-2 grains, enlarged, showing the ameba-like external shape. The white spots represent molten platinum droplets.

The diagram and the production processes, which have been compared with each other, for cBN and aBN-2 confirm that aBN-2 is obtained when the reaction conditions are chosen such that the pressure for the production of aBN-2 is markedly higher than for the production of cBN at altogether higher temperatures.

Figure 16:
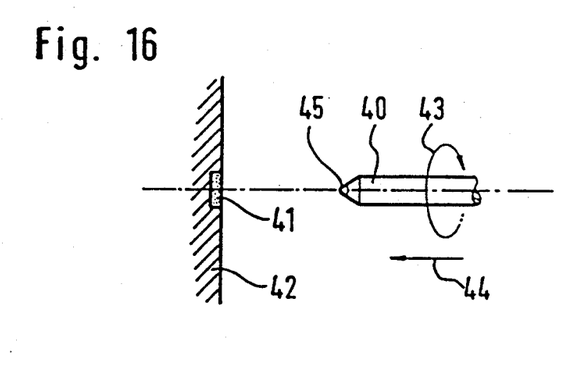
FIG. 16 shows a schematic of a hardness test.

For confirmation of the hardness of the aBN-2 according to the invention, a hardess measurement was performed according to the setup schematically shown in FIG. 16. A diamond 41 was tightly clamped in a plate 42. A drill 40 was equipped at the tip with grains 45 of amorphous aBN-2. The drill 40 was then pressed perpendicularly onto the diamond at a speed of 30,000 r.p.m. in the direction of rotation shown by arrow 43 and a pressing force of 250 g. Here a force of 8 t was reached at the tip of the aBN-2 material loaded on the tightly clamped diamond 41. This test was continued for several hours, and in the course of time an erosion of diamond by the drill tip was effected, and can then be measured as penetration into the diamond as path length.

Figure 17:
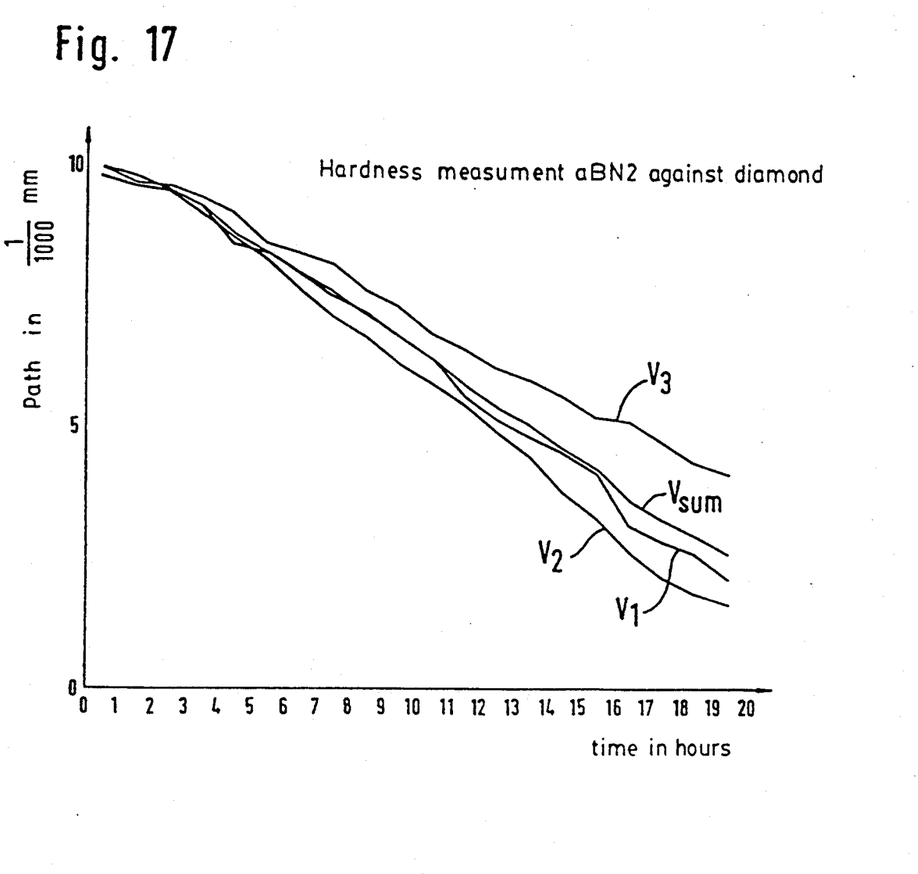
FIG. 17 shows hardness measurement curves of aBN-2 according to FIG. 16; [KEY: "Hardness measurement aBN2 against diamond" Ordinate, Path in 1/1000 mm; Abscissa, Time in hours.]

The hardness measurements of aBN-2 against diamond carried out according to FIG. 16 are shown in FIG. 17, and in fact for three trials V1, V2 and V3; the average curve from these, Vsum, is likewise indicated. The penetration depth into the diamond 41 was measured against the time in hours.

The confirmation was thus derived that the aBN-2 according to the invention, which is amorphous by electron beam and X-rays, is able to scratch diamond and has a hardness comparable to that of diamond. In addition, aBN-2 and cBN were subjected to hard X-rays (synchrotron radiation) and the diagrams were sketched.

Figure 18:
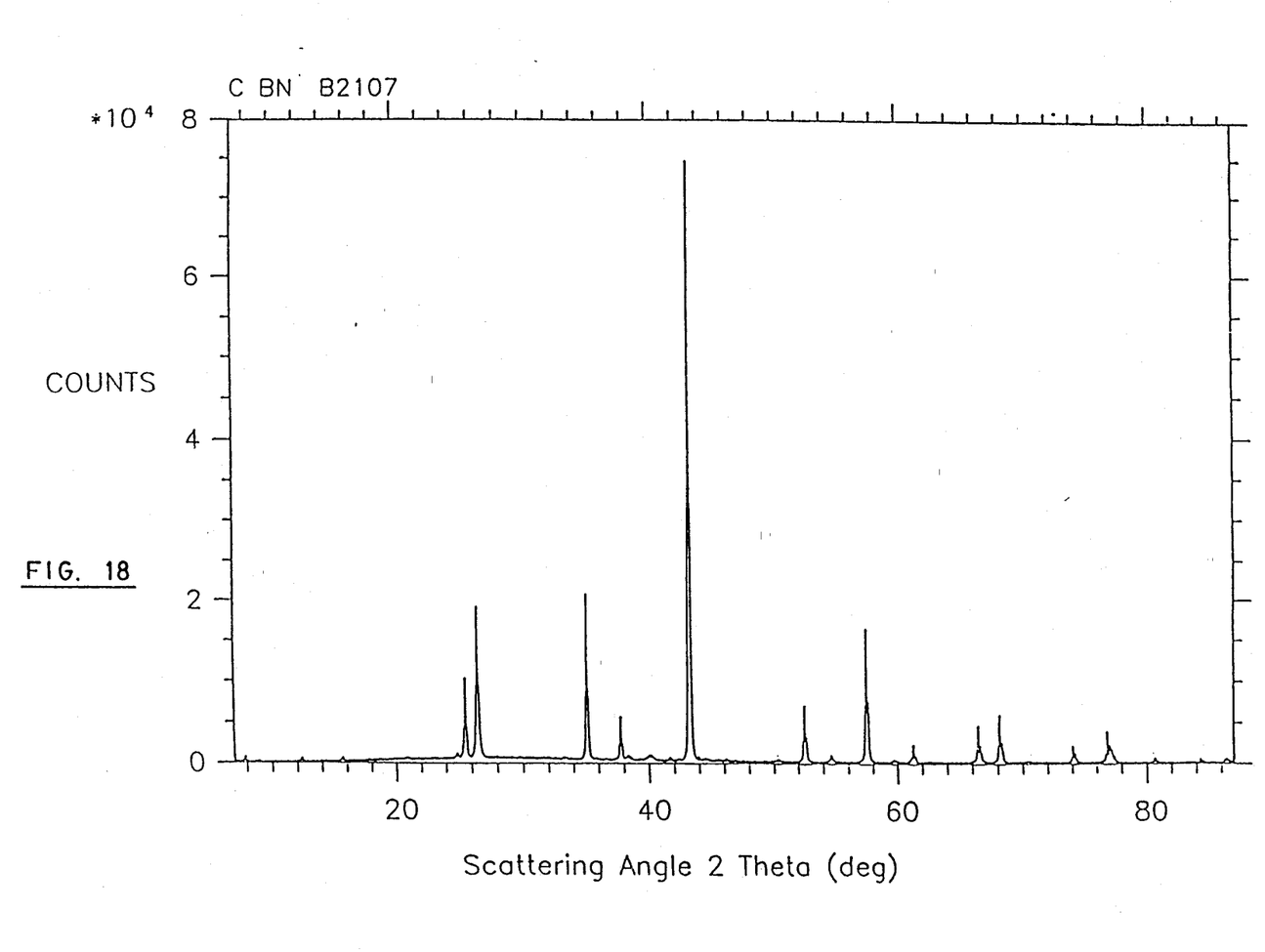
FIG. 18 shows a measurement curve of cBN with hard X-ray irradiation.

The sketched curve of cBN is shown in FIG. 18; the angular dispersion with hard X-ray irradiation was measured with a diffractometer. The single peaks are clearly visible, and provide the confirmation of the crystal structure of cBN.

Figure 19:
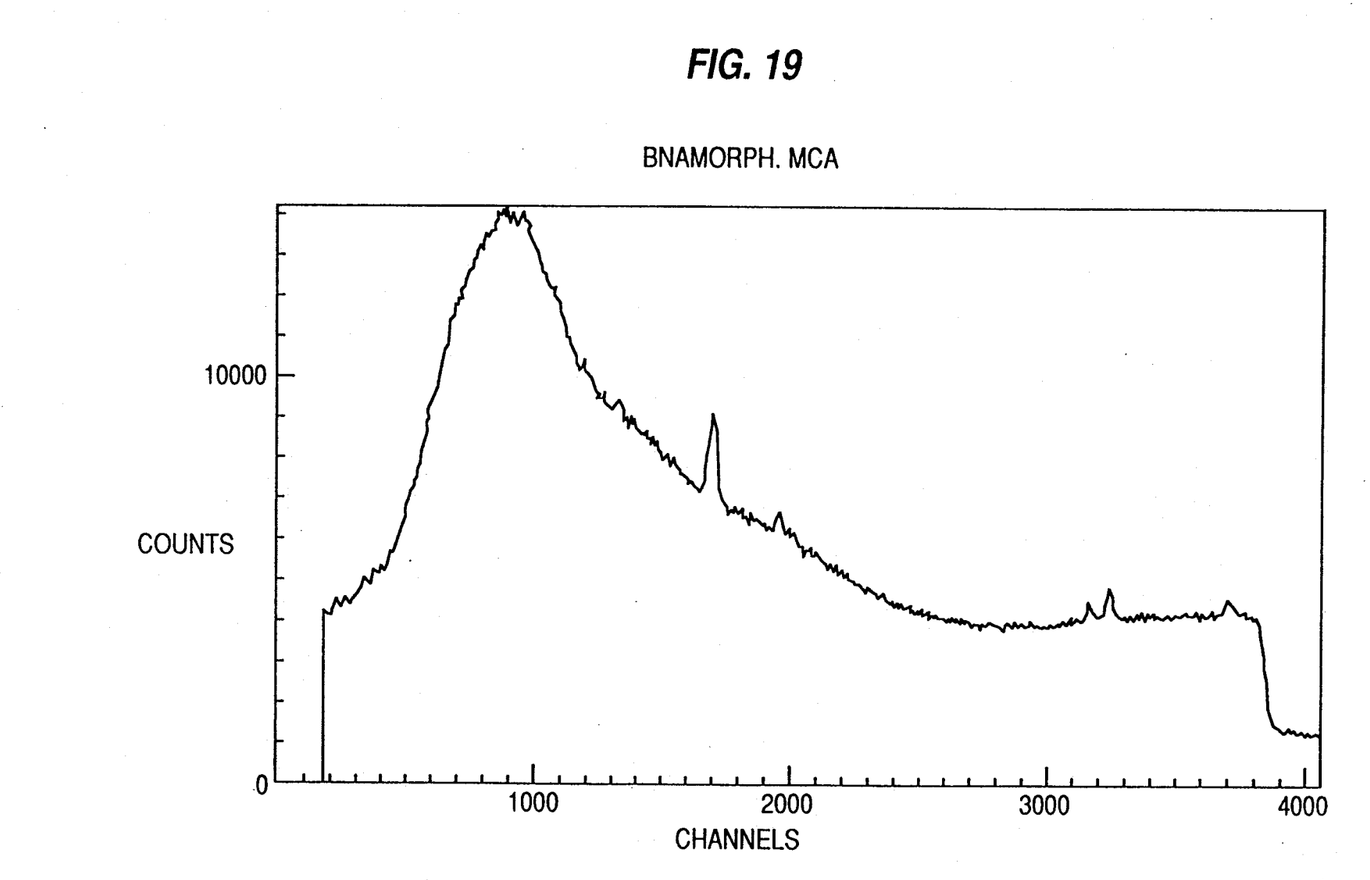
FIG. 19 shows measurement curves of aBN-2 with hard X-ray irradiation.

The measured diagram for amorphous aBN-2 is shown in FIG. 19, and in fact the energy dispersion, measured in the diffractometer, but with a substantially higher resolution, since the aBN-2 has no crystal structure and to this extent there could not be a recognizable measurement curve in a representation according to FIG. 18. The smaller, upward-directed peaks, shown in FIG. 19 and recognizable from the measurement curve, are caused by the means of attachment of the aBN-2 grains to a measurement head and hence excluded from consideration relating to aBN-2. The amorphous structure of aBN-2 is likewise established with this measurement result according to FIG. 19.

We claim:

1. A process for the production of boron nitride of high hardness equal to that of diamond from starting material consisting of hexagonal or turbostratic boron nitride (BN) and up to 20 wt % of a passive catalyst based on the amount of starting material (BN), wherein the starting material is subjected to pressures above 70 Kbar and temperatures of at least 1650° C. or higher for long enough for the starting material to be completely melted, following which the thus obtained boron nitride melt is quenched and grains of amorphous boron nitride (aBN-2) with amorphous structure as determined by X-ray and electron beam microscopic investigation are formed.

2. A process according to claim 1, wherein to quench the boron nitride melt the heat supply is first stopped and after this, pressure relief is performed.

3. A process according to claim 1 or claim 2, wherein the starting material (BN) is subjected to said temperature of at least 1650° C. or higher and said pressure of above 70 Kbar for a period of about 15 to 30 minutes.

4. A process according to claim 1, wherein the starting material (BN) is subjected to pressures of at least 75 Kbar and temperatures of at least 1900° C.

5. A process according to claim 1, wherein the passive catalyst is selected from the group consisting of water ($H_2O$), carbon (C), platinum (Pt), zirconium (Zr) and cobalt (Co) and is added to the starting material (BN).

6. A process according to claim 5, wherein the passive catalyst is added in amounts of 3-20 wt. %, based on the amount of the starting material (BN).

7. A process for the production of boron nitride of high hardness which is sufficient to scratch diamond from starting material consisting of hexagonal or turbostratic boron nitride (BN) and up to 20 wt % of a passive catalyst based on the amount of starting material (BN), wherein the starting material is subjected to pressures above 70 Kbar and temperatures of at least 1650° C. or higher for long enough for the starting material to be completely melted, following which the thus obtained boron nitride melt is quenched and grains of amorphous boron nitride (aBN-2) with amorphous structure as determined by X-ray and electron beam microscopic investigation are formed.

* * * * *